United States Patent [19]

Rothrum

[11] Patent Number: 5,673,433
[45] Date of Patent: Oct. 7, 1997

[54] GARMENT HAVING BARRIER LAYER ADHERED THERETO

[75] Inventor: Robert J. Rothrum, Coon Rapids, Minn.

[73] Assignee: Minnesota Mining & Manufacturing Company, St. Paul, Minn.

[21] Appl. No.: 354,648

[22] Filed: Dec. 13, 1994

[51] Int. Cl.⁶ .................... A41D 13/00; A41D 13/12
[52] U.S. Cl. ................... 2/46; 2/51; 2/114; 2/243.1
[58] Field of Search ........................ 2/46, 51, 114, 2/901, 243.1, 53, 69, 49.1, 49.4, 49.5, 50, 82, 87; 428/40.1, 41.7, 41.8, 41.9, 42.2, 42.3; 128/888, 889; 604/389, 387; 602/41, 42

[56] References Cited

U.S. PATENT DOCUMENTS

| | | | |
|---|---|---|---|
| Re. 24,906 | 12/1960 | Ulrich | 206/59 |
| 3,389,827 | 6/1968 | Abere et al. | 220/53 |
| 3,501,797 | 3/1970 | Nappi | 428/41.8 |
| 3,588,916 | 6/1971 | Glatt | 2/53 |
| 3,656,987 | 4/1972 | Stewart | 428/41.8 |
| 3,865,770 | 2/1975 | Blake | 260/27 R |
| 3,871,027 | 3/1975 | Orr | 2/49.5 |
| 3,903,620 | 9/1975 | Gillet | 2/114 |
| 3,916,447 | 11/1975 | Thompson | 2/114 |
| 4,112,213 | 9/1978 | Waldman | 526/279 |
| 4,287,255 | 9/1981 | Wong et al. | 428/41.8 |
| 4,288,877 | 9/1981 | Klepfer | 2/48 |
| 4,310,577 | 1/1982 | Davison et al. | 428/41.8 |
| 4,395,454 | 7/1983 | Baldwin | 428/290 |
| 4,408,996 | 10/1983 | Baldwin | 8/490 |
| 4,411,928 | 10/1983 | Baldwin | 427/2 |
| 4,413,080 | 11/1983 | Blake | 524/187 |
| 4,414,268 | 11/1983 | Baldwin | 428/289 |
| 4,419,436 | 12/1983 | Kranser | 428/41.7 |
| 4,423,523 | 1/1984 | Bodner et al. | 2/49.4 |
| 4,425,372 | 1/1984 | Baldwin | 427/2 |
| 4,433,026 | 2/1984 | Molde | 428/252 |
| 4,467,013 | 8/1984 | Baldwin | 428/289 |
| 4,499,239 | 2/1985 | Schortmann | 428/245 |
| 4,499,896 | 2/1985 | Heinecke | 128/156 |
| 4,504,977 | 3/1985 | King et al. | 2/114 |
| 4,523,333 | 6/1985 | Spangler | 2/49.4 |
| 4,569,960 | 2/1986 | Blake | 524/145 |
| 4,717,621 | 1/1988 | So et al. | 156/230 |
| 4,725,481 | 2/1988 | Ostapchenko | 428/213 |
| 4,736,467 | 4/1988 | Schwarze et al. | 2/114 |
| 5,019,071 | 5/1991 | Bany et al. | 604/389 |
| 5,042,088 | 8/1991 | Sherrod et al. | 2/53 |
| 5,106,383 | 4/1992 | Mulder et al. | 604/389 |
| 5,125,995 | 6/1992 | D'Haese et al. | 156/155 |
| 5,158,557 | 10/1992 | Noreen et al. | 604/389 |
| 5,270,111 | 12/1993 | D'Haese et al. | 428/356 |
| 5,443,875 | 8/1995 | Liu | 2/51 |
| 5,461,724 | 10/1995 | Wiedner et al. | 2/901 |
| 5,476,697 | 12/1995 | Bellander | 2/49.4 |
| 5,491,844 | 2/1996 | Kehl et al. | 2/49.5 |

FOREIGN PATENT DOCUMENTS

| | | | |
|---|---|---|---|
| A-0987451 | 4/1976 | Canada. | |
| 0 045 137 | 2/1982 | European Pat. Off. | |
| 0 136 134 | 4/1985 | European Pat. Off. | |
| 0 252 022 | 1/1988 | European Pat. Off. | |
| 0373824 | 6/1990 | European Pat. Off. | 2/50 |
| 2212710 | 8/1989 | United Kingdom | 2/49.4 |
| WO 94/26223 | 11/1994 | WIPO. | |

*Primary Examiner*—Amy B. Vanatta
*Attorney, Agent, or Firm*—Gary L. Griswold; Walter N. Kirn; F. Andrew Ubel

[57] ABSTRACT

The present invention provides a garment (e.g., a surgical gown) having adhered thereto a conformable, thin polymeric barrier film. The barrier film provides fluid resistance to the garment while still allowing the garment to "breathe." In addition, preferred barrier films are resistant to the transmission of pathogens. The barrier film of the present invention, prior to being applied to a fabric substrate, is preferably provided as an assembly in the form of an individual sheet, a roll of material, or a pad of stacked sheets. The assembly preferably comprises a relatively thin, conformable polymeric film; a pressure sensitive adhesive attached to at least a portion of one surface of said film; a means for protecting said adhesive prior to application of the film to a fabric substrate; and a means for handling said adhesive coated film during application of said film to said fabric substrate, wherein said handling means is attached to said film more tenaciously than said protecting means is attached to the adhesive surface of said film.

19 Claims, 4 Drawing Sheets

GARMENT HAVING BARRIER LAYER ADHERED THERETO

FIELD OF THE INVENTION

This invention relates to a garment (e.g., a surgical gown) having adhered thereto a conformable, thin polymeric barrier film. Particularly, this invention relates to conformable, thin polymeric adhesive-coated barrier films combined with a carrier system to allow easy application of the adhesive barrier films to a fabric piece or a finished garment and to the application method for doing so.

BACKGROUND OF THE INVENTION

This invention relates to protective clothing, e.g., a garment worn by a surgeon or other medical practitioner in an operating room or other surgical environment. Typically, garments worn by medical practitioners may be made to be "reusable" or "disposable." Reusable surgical gowns and drapes have traditionally been made of cotton or a cotton/polyester blend having a high thread count, such as 140-thread count per square inch for cotton muslin up to 280 threads per square inch for tighter woven pima cotton. These reusable woven materials are washed, sterilized, usually by autoclaving in steam, and wrapped in a sterile package to retain sterility until use. After use, the reusable gown is recycled by again washing, autoclaving, sterile wrapping, etc. This process requires careful washing and sterilization because of the concern for potential contamination from one procedure and event to the next. Single-use, or "disposable" garments, have been particularly well received for medical applications as they avoid the need for this careful washing step.

Prior proposals for protective surgical gowns and drapes include a three-component laminate as described in U.S. Pat. No. 4,433,026 composed of a knit cotton layer and a polyester continuous filament outer layer with an expanded yet breathable PTFE film interposed between the two. The expanded PTFE film laminated between the two fibrous layers is said to permit water vapor to pass through the composite.

U.S. Pat. No. 4,499,139 describes a one piece non-woven bacterial barrier material in which a small cell foam is placed within the non-woven substrate to define a bacterial barrier. Absorbent microbicidal fabrics are described in U.S. Pat. Nos. 4,408,996; 4,414,268; 4,395,454 and 4,425,372. These patents describe surgical drapes that have an absorbent, highly-wettable, bioactive surface made of a non-cellulosic substrate with a non-leachable, bioactive compound fixed to the substrate. Non-woven fabrics treated to repel water, saline solution, body fluids and solvents are described in U.S. Pat. Nos. 4,411,928 and 4,467,013. The non-woven fabric is provided with a bioactive finish, and the fabrics so-produced are described as useful for the construction of surgeons gowns, medical drapes, isolation gowns, instrument wraps and the like.

Unfortunately, the above laminate fabrics are quite expensive, especially for use as a disposable single-use garment. In addition, the seams of garments made from such fabrics must be treated to prevent migration or transport of fluids or pathogens through the needle holes left by the sewing process.

SUMMARY OF THE INVENTION

The present invention provides a garment (e.g., a surgical gown) having adhered thereto a conformable, thin polymeric barrier film. The barrier film provides fluid resistance to the garment while still allowing the garment to "breathe" (i.e., the barrier films of the present invention possess good moisture vapor transmission). This feature allows the barrier film protected garment to be comfortably worn for longer periods of time than typical more occlusive garments. In addition, preferred barrier films are resistant to the transmission of pathogens.

Of particular importance is the use of the instant barrier film assembly in the garment field wherein thin, conformable adhesive-coated polymeric barrier films are applied to a garment (the adhesive-coated barrier film may be applied to the inside and/or the outside of the garment). The thin, conformable adhesive-coated polymeric barrier films are preferably applied to the garment or fabric without wrinkling of the film or fabric. Therefore, it is important that the adhesive-coated barrier film not block or otherwise stick together during application to the garment or fabric piece. The barrier film assemblies of the present invention provide this capability.

The barrier film of the present invention, prior to being applied to a fabric substrate, is preferably provided as an assembly in the form of an individual sheet, a roll of material, or a pad of stacked sheets. The assembly preferably comprises (1) a relatively thin, conformable polymeric film, (2) a pressure sensitive adhesive attached to at least a portion of one surface of said film, (3) a means for protecting said adhesive prior to application of the film to a fabric substrate, and (4) a means for handling said adhesive-coated film during application of said film to said fabric substrate.

In one embodiment, the assembly is provided as individual sheets wherein each sheet comprises (1) a relatively thin, conformable polymeric film, (2) a pressure sensitive adhesive attached to at least a portion of one surface of said film, (3) a release liner attached to the adhesive-coated surface of said film, and (4) a releasable carrier layer attached to the surface of said film opposite the surface containing said pressure-sensitive adhesive, said releasable carrier layer being attached to said film more tenaciously than the release liner is attached to the adhesive surface of said film.

In another embodiment, the assembly is provided as a roll comprising (1) a relatively thin, conformable polymeric film, (2) a pressure sensitive adhesive attached to at least a portion of one surface of said film, (3) a release liner attached to the adhesive-coated surface of said film, and (4) a releasable carrier layer attached to the surface of said film opposite the surface containing said pressure-sensitive adhesive, said releasable carrier layer being attached to said film more tenaciously than the release liner is attached to the adhesive surface of said film.

In another embodiment, the assembly is provided as a roll comprising (1) a relatively thin, conformable polymeric film, (2) a pressure sensitive adhesive attached to at least a portion of one surface of said film, and (3) a separator layer attached to the surface of said film opposite the surface containing said pressure-sensitive adhesive, said separator layer having a first release surface and a second releasable surface, wherein said releasable surface is attached to said film more tenaciously than said release surface is attached to the adhesive surface of said film.

In another embodiment, the assembly is provided as a pad of sheets, wherein said sheets comprise (1) a relatively thin, conformable polymeric film, (2) a pressure sensitive adhesive attached to at least a portion of one surface of said film, and (3) a separator layer (alternatively referred to as a "separator sheet") attached to the surface of said film opposite the surface containing said pressure-sensitive adhesive, said separator layer having a first release surface and a second releasable surface, wherein said releasable surface is attached to said film more tenaciously than the adhesive surface is attached to the release surface of an adjacent sheet.

The instant barrier film assemblies may be used in a method for applying the relatively thin, conformable polymeric film to a fabric substrate, comprising the steps of: exposing the adhesive surface of a relatively thin, conformable polymeric film, wherein said film is supported by a releasable carrier layer; placing said film on said fabric substrate thereby causing said film to adhere to said substrate; and removing said releasable carrier layer from said film.

BRIEF DESCRIPTION OF THE DRAWINGS

The invention may be more clearly understood by reference to the drawings, wherein.

DETAILED DESCRIPTION OF THE INVENTION

Reference is made to FIGS. 1 to 7 wherein like parts have been given like index numbers. Throughout the drawings the various layers of film, adhesive, carrier layer or liner have been exaggerated in thickness for purposes of illustration and clarity. In particular, the adhesive layer is shown in exaggerated thickness. In addition, the size of the various components may be modified, if desired, to accommodate the particular needs of the barrier film.

Figure 1:
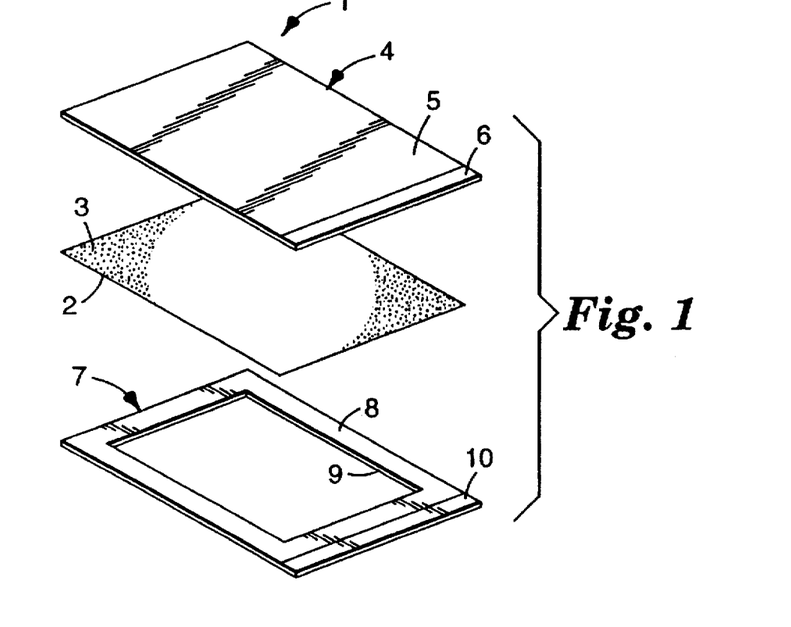
FIG. 1 is an expanded perspective view showing one embodiment of the barrier film assembly of the present invention prior to application of the barrier film onto a fabric substrate.

Referring to the figures in more detail, FIG. 1 discloses the barrier film assembly 1 comprising thin, conformable polymeric film 2 coated with pressure-sensitive adhesive 3 on the upper surface thereof. Above but normally attached to the upper surface of film 2 containing adhesive 3 is release liner 4 containing portion 5 for covering of adhesive 3 and tab 6 which provides a means for removal of the release liner 4 from adhesive 3 without touching and thus contaminating adhesive 3. Below film 2 is releasable carrier layer 7 comprising frame 8 surrounding opening 9 and containing tab portion 10 for purposes of removal of releasable carrier layer 7 from film 2. Opening 9 provides frame 8 with flexibility and conformability. Tab 6 and tab portion 10 are optional but are preferred for the aforesaid reasons. Tab 6 and tab portion 10 can be integrated with release liner 4 and frame 8, respectively, or can be attached separately by adhesive or other well known means. In addition, liner 4 may be provided in two or more parts 4a and 4b (not shown), wherein a first part can serve as a tab (i.e., provides a means for removal of a first part of the release liner 4a from adhesive 3 without touching and thus contaminating adhesive 3). The second part of the liner 4b may then be removed after the film is applied to the fabric substrate. Releasable carrier layer 7 is preferably attached to the film 2 by means of the mechanical attachment forces which result, e.g., when film 2 is extruded or otherwise formed on releasable carrier layer 7. Alternatively, releasable carrier layer 7 may be attached to the film by heat sealing methods such as described in U.S. Pat. application Nos. 08/034,306 and 08/258,783 (Heinecke et al.).

Figure 2:
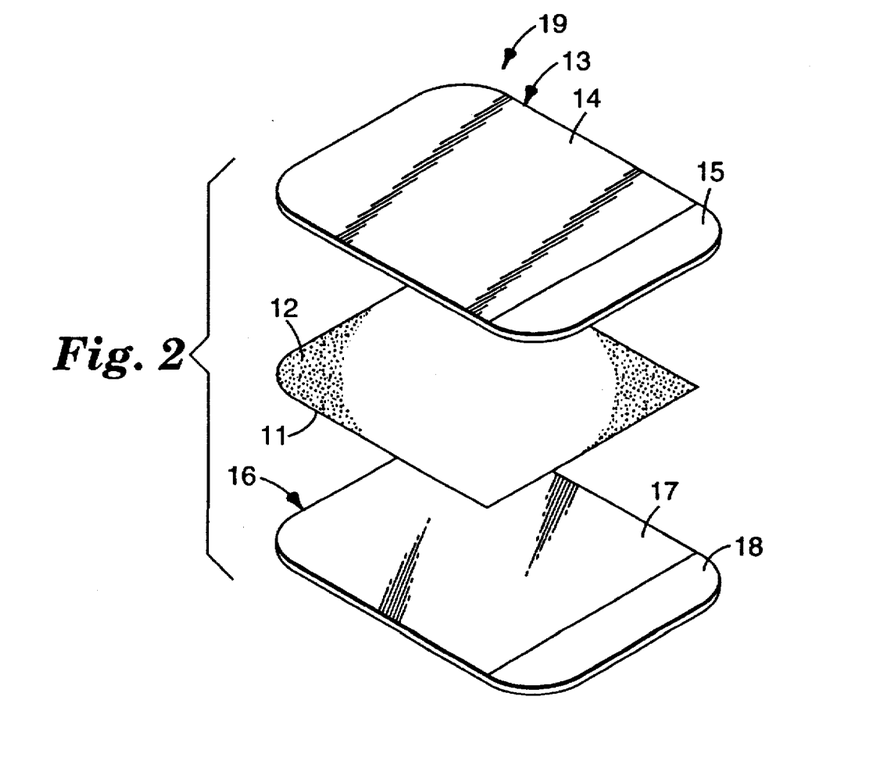
FIG. 2 is an expanded perspective view of another embodiment of the barrier film assembly of the present invention prior to application of the barrier film onto a fabric substrate.

FIG. 2 depicts another presently preferred embodiment of the present invention. In this embodiment a thin, conformable polymeric film 11, of the same type as film 2 of the previous embodiment, containing pressure-sensitive adhesive 12 on one surface thereof, is sandwiched between release liner 13 (containing portion 14 for covering adhesive 12 on film 11 and tab portion 15 which permits removal of the release liner 13 without requiring contact with adhesive 12) and releasable carrier layer 16 (comprising portion 17 which is attached to the nonadhesive surface of film 11 and tab 18 which permits removal of releasable carrier layer 16 from film 11 ). Releasable carrier layer 16 is attached to film 11, as described with respect to the embodiment of FIG. 1. This embodiment will be referred to generally as 19.

Figure 3:
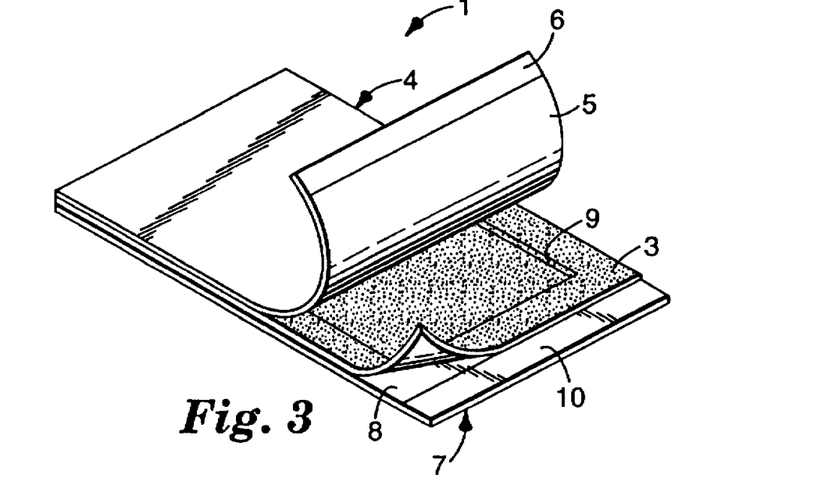
FIG. 3 is a perspective view of the barrier film assembly of FIG. 1 shown partially peeled apart.

FIG. 3 depicts barrier film assembly 1 with the parts thereof shown attached to each other, specifically release liner 4 is attached at portion 5 to the adhesive 3 of film 2. The tab 6 of release liner 4 has been pulled so that a portion of adhesive 3 on film 2 is exposed. This depicts how release liner 4 is removed from film 2 containing adhesive 3, i.e., tab 6 is grasped as well as tab 10 of releasable layer 7. Since the release liner 4 is removed more easily from adhesive 3 than is releasable carrier layer 7 from film 2, the release liner 4 is removed leaving film 2 containing adhesive 3 with releasable carrier layer 7 containing tab portion 10, opening 9 and frame 8 attached thereto. In FIG. 3, a corner 20 of film 2 is raised to show how releasable carrier layer 7 is removed from film 2 and to indicate that there is no adhesive attaching film 2 to releasable carrier layer 7. Also in FIG. 3, opening 9 is visible because film 2 and adhesive 3 may be transparent.

Figure 4:
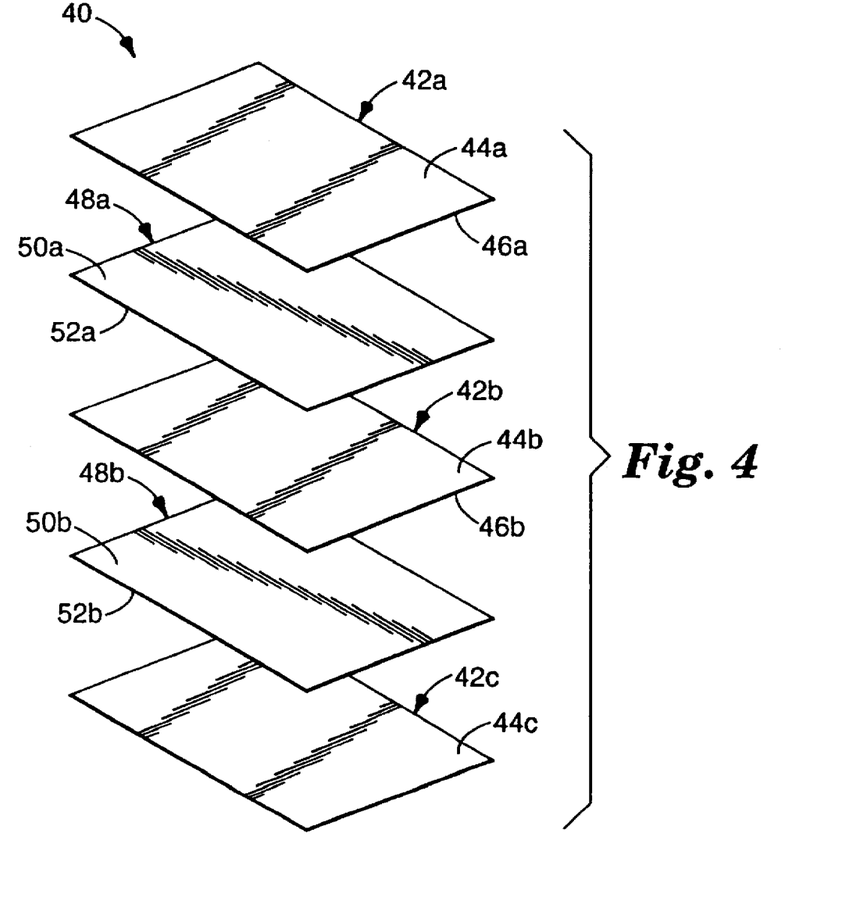
FIG. 4 is an expanded perspective view showing one embodiment of the barrier film pad assembly of the present invention prior to application of the barrier film onto a fabric substrate and wherein only a few sheets of barrier film are shown.

FIG. 4 depicts another embodiment of the present invention. In this embodiment a barrier film pad assembly 40 is provided comprising alternating layers of separator sheet 42 and barrier film 48. Barrier film 48 (e.g., two such sheets are shown as 48a and 48b) comprises a thin, conformable polymeric film 50a, of the same type as film 2 of the first embodiment, containing pressure-sensitive adhesive 52a on one surface thereof. Barrier film 48a is sandwiched between two separator sheets 42a and 42b. Against the surface of adhesive 52a of barrier film 48a is release surface 44b of separator sheet 42b. Against non-adhesive surface 50a of barrier film 48a is releasable surface 46a of separator sheet 42a. With this construction, one may easily remove an individual barrier film assembly comprising one separator sheet and one barrier film. At the same time that the individual assembly is removed from the pad an adhesive surface of the assembly is being exposed. Notably, tabs as previously described may be included along one or more edges of the pad to facilitate individual sheet removal. Also notably, the pad may comprise more than the two barrier film sheets depicted in FIG. 4. Preferred pads of the present invention may comprise 10 or more stacked and separated barrier film sheets. More preferred pads of the present invention comprise 50 or more stacked and separated barrier film sheets.

Figure 5:
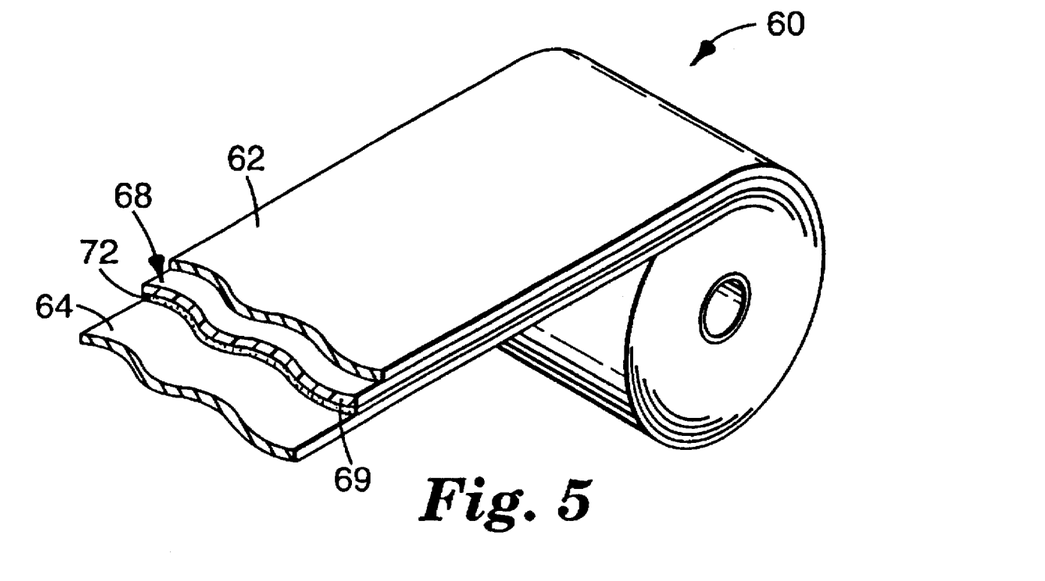
FIG. 5 is a perspective view showing one embodiment of the barrier film roll assembly of the present invention prior to application of the barrier film onto a fabric substrate.
Figure 6:
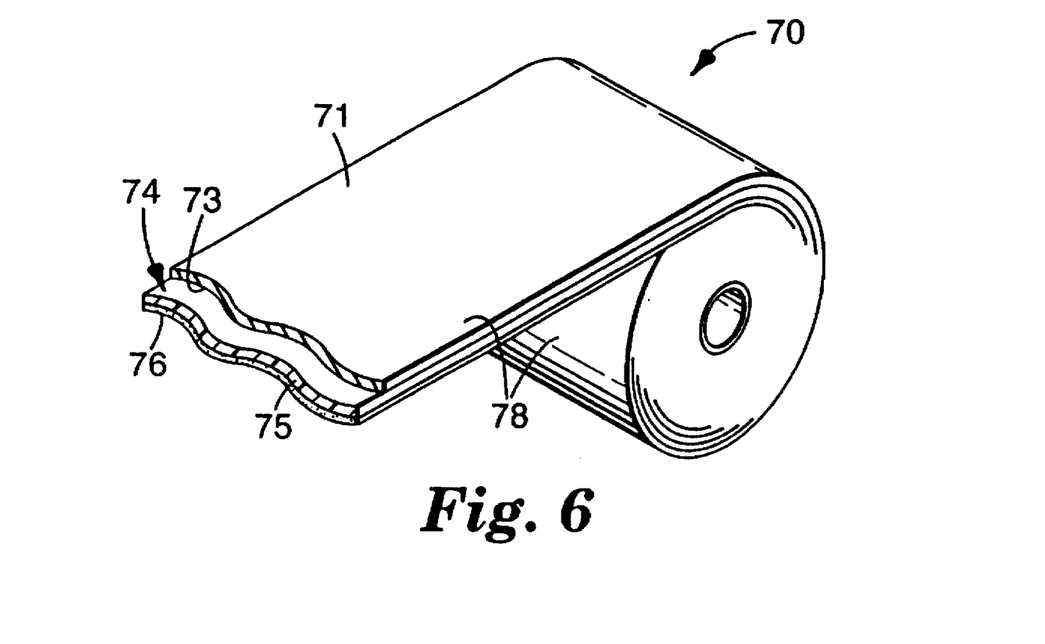
FIG. 6 is a perspective view showing another embodiment of the barrier film roll assembly of the present invention prior to application of the barrier film onto a fabric substrate.

FIGS. 5 and 6 depict two alternative barrier film roll assemblies. When unwound, the barrier film roll assembly of FIG. 5 comprises three separable layers (namely, releasable carrier comprising release liner 64, and barrier film 68 comprising thin, conformable polymeric film 69 and adhesive 72 coated thereto). Barrier film 69, comprising the same type of film as film 2 of the previous embodiment, containing pressure-sensitive adhesive 72 on one surface thereof, is sandwiched between release liner 64 and releasable carrier layer 62. Releasable carrier layer 62 and release liner 64 are attached to barrier film 68, as described with respect to the embodiment of FIG. 1. This embodiment will be referred to generally as 60. When unwound, the barrier film roll assembly of FIG. 6 comprises two separable layers (namely, separator sheet 71 having releasable surface 73 and release surface 78; and barrier film 74 comprising thin, conformable polymeric film 75 and adhesive 76 coated thereto). When wound into a roll, separator sheet 71 thus serves both the function of the releasable carrier layer and the release liner as described with respect to the embodiment of FIG. 5. As the sheet is unwound, the adhesive surface of the barrier film is exposed.

Figure 7:
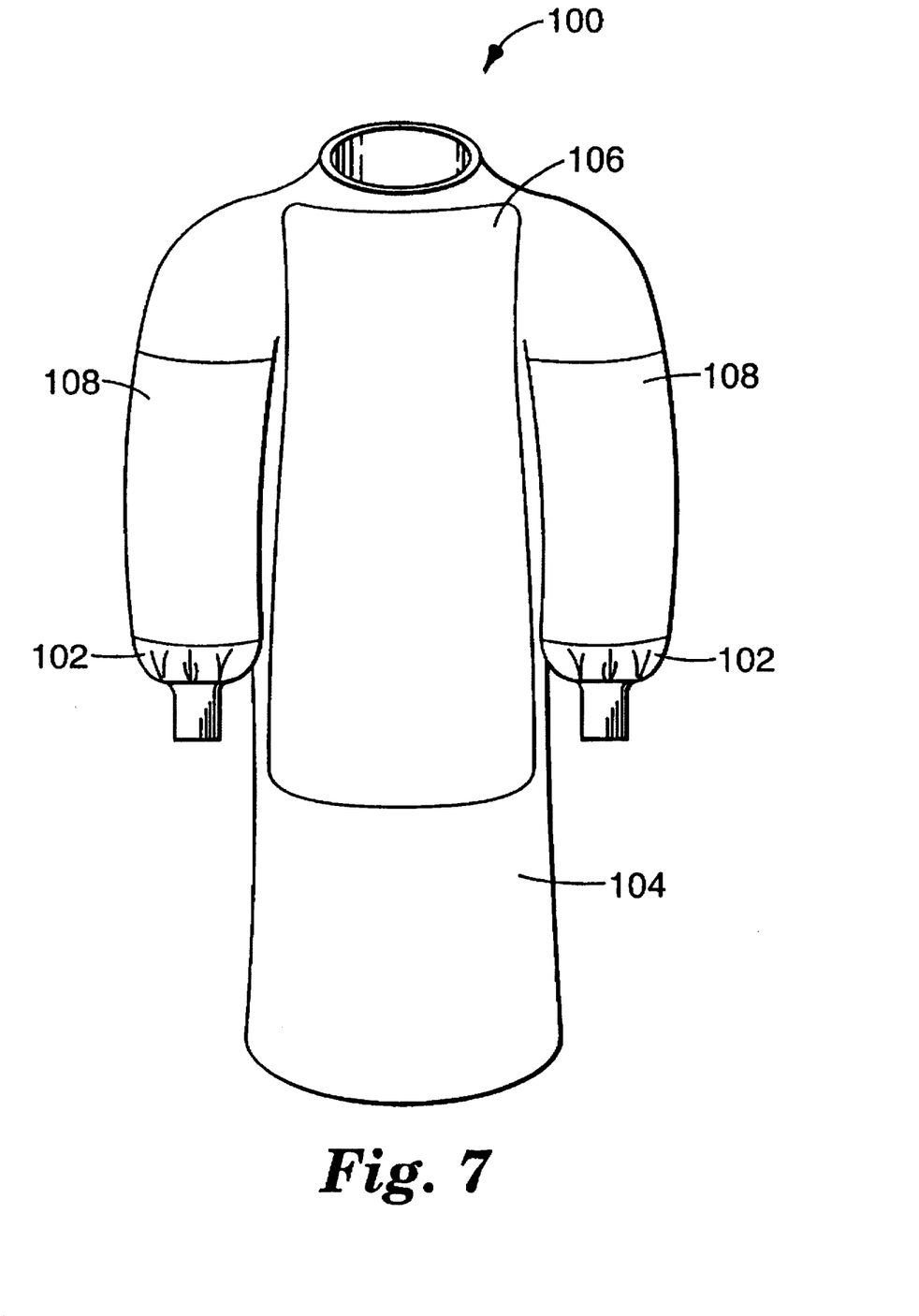
FIG. 7 is a perspective view of a surgical gown of the present invention, wherein a portion of the gown has a barrier film adhered thereto.

FIG. 7 illustrates a surgical gown 100 of the present invention, wherein portions of the gown body 106 and sleeves 108 are covered with the barrier film of present invention. Preferably at least the front portion of the garment (e.g., from neckline down to midthigh) is covered with the barrier film of the present invention as it is this portion which is most often contacted by fluid spills and contamination. If desired a region of fluid absorbent material or a fluid collection pouch, as described in U.S. patent application No. 08/273,598, may be provided (e.g., along the lower portion of the garment) to absorb or collect fluids which are repelled by the barrier film. If desired, the entire garment may be covered with the barrier film. Application of the film to the fabric substrate may be performed before sewing the garment or after the garment is completed. If necessary, exposed seams may be covered with a narrow strip of adhesive barrier film to cover any needle holes which might provide a pathway for transmission of the contaminant.

Suitable barrier films of the present invention include thin, conformable polymeric films. Preferably, the films are from 6 to 50 microns in thickness, more preferably from 12 to 25 microns. Conformability is somewhat dependent on thickness, thus the thinner the film the more conformable the film. Reference has been made herein to the films utilized in the device of the present invention being conformable to clothing. This means that when a film of the present invention is applied to a garment surface it conforms to the surface even when the surface is moved. More preferred films are conformable to a garment sleeve or leg. When the garment sleeve or leg is flexed and then returned to its unflexed position, the film stretches to accommodate the flexation of the garment but is resilient enough to continue to conform to the garment when the garment is returned to its unflexed condition. A measure of conformability is the $F_{10}$ modulus of the film which is the grams force it takes to stretch a material ten percent of its original length. The films of the present invention preferably have a $F_{10}$ modulus no greater than about 180 grams per cm width and preferably less than about 140 grams per cm width. Suitable garments of the present invention can be made with films which have $F_{10}$ moduli upwards of 450 grams per cm width, however, as the $F_{10}$ modulus increases the conformability decreases. $F_{10}$ modulus, as referred to herein, is determined using an Instron Unit Model 1102 from Instron Corp., Canton, Mass. The cross-head speed of the Instron is 25.4 cm per minute, the gauge length is set at 5 cm, and the test sample cut to test a 2.54 cm width.

Suitable barrier films (with the adhesive applied thereto) are moisture vapor permeable, thereby enabling the protected garment to breathe. Preferred barrier films (with adhesive applied thereto) have a moisture vapor transmission rate at least 500 g m$^{-2}$ 24 hrs$^{-1}$. More preferred barrier films (with adhesive applied thereto) have a moisture vapor transmission rate at least 1,000 g m$^{-2}$ 24 hrs$^{-1}$. Most preferred barrier films (with adhesive applied thereto) have a moisture vapor transmission rate at least 1,500 g m$^{-2}$ 24 hrs$^{-1}$. Suitable fabrics with barrier film adhesively applied thereto are moisture vapor permeable, thereby enabling the protected garment to breathe. Preferred fabrics with barrier film adhesively applied thereto have a moisture vapor transmission rate at least 500 g m$^{-2}$ 24 hrs$^{-1}$. More preferred fabrics with barrier film adhesively applied thereto have a moisture vapor transmission rate at least 800 g m$^{-2}$ 24 hrs$^{-1}$.

Suitable fabrics with barrier film adhesively applied thereto resist water penetration, thereby protecting the wearer film becoming wet or contacted by pathogens. Preferred fabrics with barrier film adhesively applied thereto have a moisture resistance at least 30 cm when tested as described in Example 4. More preferred fabrics with barrier film adhesively applied thereto have a moisture resistance at least 50 cm when tested as described in Example 4. Most preferred fabrics with barrier film adhesively applied thereto have a moisture resistance at least 70 cm when tested as described in Example 4.

Examples of films which are useful in Applicant's invention include polyurethane, elastomeric polyester such as DuPont "Hytrel" polyester elastomer (Wilmington, Del.), blends of polyurethane and polyester, and styrene/butadiene block copolymers such as "Kraton" brand thermoplastic rubber (Shell Chemical Company, Houston, Tex.). Particularly preferred films for use in the present invention are polyurethane and elastomeric polyester films.

Suitable pressure sensitive adhesives for use in the present invention include those pressure sensitive adhesives which are capable of providing the necessary amount of peel strength and/or shear strength to function in the manner required (e.g., sufficient strength to securely attach the film to the fabric surface without unintended detachment). Preferred adhesives are non-toxic, hypoallergenic, and are most preferably also environmentally safe.

Suitable adhesives which can be used on the film of the present invention include those described in Ulrich U.S. Pat. No. RE 24,906, particularly a copolymer of 97% iso-octyl acrylate units and 3% acrylamide units and a copolymer of 94% iso-octyl acrylate units and 6% acrylic acid units. Other suitable pressure sensitive acrylate adhesives for use in the present invention include copolymers which are reaction products of the polymerization of at least one "A" monomer and at least one "B" monomer to yield a copolymer having an inherent viscosity of about 1.0 dl/g to about 2.0 dl/g. The A monomer is a polymerizable monomer comprising an acrylate or methacrylate ester of a non-tertiary alcohol or a mixture of non-tertiary alcohols with the alcohols having from 1 to 14 carbon atoms and desirably averaging about 4 to 12 carbon atoms. The B monomer is an ethylenically unsaturated compound and desirably may be acrylic acid, methacrylic acid, itaconic acid, acrylamide, methacrylamide, acrylonitrile, methacrylonitrile, vinyl acetate, N-vinyl pyrrolidone, or combinations thereof. The A monomer is polymerizable and contributes the viscoelastic properties of the pressure sensitive adhesive copolymer. Non-limiting examples of such A monomers include the esters of acrylic acid or methacrylic acid with non-tertiary alkyl alcohol such as 1-butanol, 1-pentanol, 2-pentanol, 3-pentanol, 2-methyl-1-butanol, 1-methyl-1-butanol, 1-methyl-1-pentanol, 2-methyl-1-pentanol, 3- methyl-1-pentanol, 2-ethyl-1-butanol, 2-ethyl-1-hexanol, 3,5,5-trimethyl-1hexanol, 3-heptanol, 2-octanol, 1-decanol, 1-dodecanol, and the like. Such monomeric acrylic or methacrylic esters are known in the art, and many are commercially available. The B monomer is an ethylenically unsaturated compound copolymerized with the A monomer to affect the physical properties of the resulting pressure sensitive adhesive copolymer. In general, the presence of the B monomer will reduce the flexibility of the resulting pressure sensitive adhesive copolymer. Thus, the weight percentages of the A monomer and the B monomer should be balanced in order to provide a pressure sensitive adhesive copolymer having an inherent viscosity of preferably from about 1.0 dl/g to about 2.0 dl/g. The weight percentage ratio of A monomer: B monomer ranges from about 85:15 to about 98:2 and desirably from about 90:10 to 97:3.

Other useful adhesives are those described in U.S. Pat. No. 3,389,827 which comprise block copolymers having three or more polymer block structures having a general configuration —A—B—A— wherein each A is a thermoplastic polymer block with a glass transition temperature above room temperature (i.e., above about 20° C.) having an average molecular weight between about 5,000 and 125,000 and B is a polymer block of a conjugated diene having an average molecular weight between about 15,000 and 250,000. Additional examples of useful adhesives are iso-octyl acrylate/n-vinyl pyrrolidone copolymer adhesives and crosslinked acrylate adhesives such as for example those described in U.S. Pat. No. 4, 112,213.

The pressure sensitive adhesive should be tacky at room temperature. Also, given that the protected fabric may be worn close to the wearer's body and perhaps against her skin, the adhesive preferably should be hypoallergenic, i.e., even after continuous contact with skin, there is no significant skin sensitization or irritation. The pressure sensitive adhesive may have a tackifier added to the formulation to improve tack. Commercially available tackifiers include "Foral" branded colophony acid rosins, such as "Foral AX" and "Foral 85" rosins, commercially available from Hercules Corporation, and partially hydrogenated methylstyrene hydrocarbon resins, such as "Piccolastic A25" resin, also commercially available from Hercules Corporation. Such tackifiers can be added during preparation of the pressure sensitive adhesive in an amount of about 35–40 weight percent of the copolymer solids.

Alternate pressure sensitive adhesives useful in the present invention are hypoallergenic Kraton rubber-based pressure sensitive adhesives produced using styrene-butadiene or styrene-isoprene copolymers commercially available as Kraton branded copolymers from Shell Oil Company of Houston, Tex. In general, this type of adhesive may exhibit a low MVTR or may cause the laminate to have an undesirably low MVTR. To increase the MVTR of laminates comprising this type of adhesive it may be desirable to pattern coat the adhesive securing the polymeric film to the fabric. A variety of Kraton based pressure sensitive adhesives are disclosed in U.S. Pat. Nos. 5,019,071 (Bany et al.) and 5,158,557 (Noreen et al.), the disclosures of which are incorporated by reference herein. Preferred as Kraton rubber-based pressure sensitive adhesives are Kraton 1107, Kraton 1111, Kraton 1101, and Kraton D branded copolymers, tackified with compatible tackifiers such as Escorez® 1310LC branded tackifier commercially available from Exxon Chemicals, a solid $C_5$ tackifying resin commercially available as Wingtack® Plus brand tackifier from Goodyear Tire and Rubber Company, Akron, Ohio and naphthenic oils having 10% aromatics commercially available as Shellflex® 371 from Shell Oil Company. Such tackifiers can comprise about 45 to about 70 weight percent of the pressure sensitive adhesive, while the Kraton copolymer can comprise about 30 to 55 weight percent.

Additional alternate pressure sensitive adhesives useful in the present invention are the water-dispersible pressure sensitive adhesives disclosed in U.S. Pat. Nos. 3,865,770; 4,413,080; 4,569,960; 5,125,995; and 5,270,111 and in U.S. patent application Ser. Nos. 07/763,823; 07/889,647; and 08/093,080 the disclosures of which are herein incorporated by reference. These adhesives are especially useful when reusable fabrics are protected with the barrier films of the present invention (i.e., the barrier film may be easily separated from the reusable fabric during the washing process and a new barrier film may be applied to the clean garment).

Pressure sensitive adhesive copolymers can be copolymerized using known polymerization techniques such as emulsion polymerization and solution polymerization. Sources of polymerization preparation and techniques include *Organic Polymer Chemisty*, Saunders et al. (Halsted Publishing Company, New York 1973); *Applied Polymer Science*, Tess et al. (American Chemical Society, Washington, D.C., 1981); *Principles of Polymerization*, Odien (John Wiley and Sons, New York, 1981); and the *Handbook of Pressure-Sensitive Adhesive Technology, Second Edition*, Satas, Ed., (Van Nostrand Reinhold Company, New York, 1989), the disclosures of which are incorporated by reference. Specifically, acrylate pressure sensitive adhesive copolymers can be prepared according to U.S. Pat. No. 2,884, 126/RE 24,906 (Ulrich), the disclosure of which is incorporated by reference herein. The presently preferred acrylate copolymer pressure sensitive adhesive can be prepared by emulsion polymerization according to Example 5 of U.S. Pat. No. 2,884, 126/RE 24,906, except that tackifier is added to the emulsion in an amount of about 35–40% weight percent of copolymer solids, and that tackified copolymer is dissolved in a heptaneiso-propanol (70:30) solution. The presently preferred Kraton copolymer pressure sensitive adhesive can be prepared in the manner as disclosed in Examples 1–13 of U.S. Pat. No. 5,019,071, the disclosure of which is incorporated by reference above.

The release liner (or separator sheet having a release surface) which is attached to the adhesive on the film is a liner which releases with less force than is required for the releasable carrier layer (or separator sheet having a releasable surface) to be removed from the film. Generally the adhesion to the liner (as determined in accordance with ASTM D3330-76) is between about 1 and 8 grams per 1 cm width while the adhesion of the film to the releasable carrier layer is greater than that to the liner and ranges up to about 30 grams per 1 cm width. Examples of release liners include liners made of or coated with polyethylene, polypropylene and fluorocarbons and silicone coated release papers or polyester films. Examples of the silicone coated release papers are Polyslik S-8004, 130 g/m² bleached silicone release paper supplied by H. P. Smith Co., Chicago, Ill.; 126 g/m² bleached two-sided silicone coated paper supplied by Daubert Chemical Co., Dixon, Ill.; and silicone treated bleached Kraft-Glassine paper liner. The releasable carrier layers can comprise materials generally of the type described in respect to the release liner although as noted above more adherent varieties or surfaces of the above materials will be used as releasable carrier layers. The releasable carrier layers are attached with less tenacity to the film than the adhesive attaches the film to the fabric substrate.

The barrier film is adhered to a fabric substrate thereby providing the wearer with a fluid resistant, yet comfortable garment. The barrier film may be applied to the inside surface of the garment and/or the outside surface of the garment. The garment may comprise conventional reusable fabrics (e.g., cotton or cotton/polyester blend) or disposable (i.e., single or limited use) fabrics such as non-woven fabrics.

Barrier films of the present invention are manufactured using conventional film forming techniques, for example extrusion, casting or calendaring as well as conventional adhesive placement and slitting techniques. In one embodiment, the releasable carrier layer is preferably coated with the polymeric film by means of extruding the polymeric substance through a die onto the releasable carrier layer. Alternatively, the releasable carrier layer may be heat sealed (or "heat-bonded") to the barrier film (e.g., after the film has been coated with adhesive and placed on a liner). Adhesive is then applied to the film using direct or, more preferably, transfer coating techniques. The release liner is then placed over the adhesive of the film and the combination is appropriately die cut, either through control-depth die cutting in respect to the embodiment shown in FIG. 1 or in respect to embodiment 19, to cut out the totality of the device to provide the final product. Notably, the size and shape of the cut out sheet may be tailored to fit a particular clothing panel. For example, an "apron" shaped piece may be die cut to cover the chest and thigh portion of a surgical gown. Similarly, sheets may be custom sized to wrap a garment sleeve or leg.

The barrier film assembly of the present invention may be produced in the form of individual units having the configuration shown in, for example, FIGS. 1 and 2. Alternatively, the barrier film assembly is packaged as a continuous roll of adhesive-coated film with a releasable carrier layer attached to the non-adhesive surface of the film shown in, for example, FIG. 5 and 6. When in roll form, one surface of the releasable carrier layer may be attached to the non-adhesive surface of the film and the adhesive layer of the film contacts the opposite surface of the releasable carrier layer. In this configuration, the releasable carrier layer and release liner are one and the same (i.e., a "separator sheet"). However, the releasable surface of the separator sheet is attached more tenaciously to the film than the adhesive is attached to the release surface. Alternatively, a separate release liner and releasable carrier layer could be used with the roll form of the device. Also alternatively, the barrier film assembly may be provided in the form of a pad, shown in, for example, FIG. 4.

The following examples are offered to aid in understanding of the present invention and are not to be construed as limiting the scope thereof. Unless otherwise indicated, all parts and percentages are by weight.

EXAMPLES

Example 1

A 22 micrometer film of "Estane 58309NAT022" polyurethane resin (B. F. Goodrich, Cleveland, Ohio) was extruded using a 6.4 cm HPM Torque Master 3 screw extruder (from HPM Corporation, Mount Gielead, Ohio) utilizing a melt temperature of 200° C. The film was extruded onto the kraft side of a 127 grams per meter paper (Paper No. 78-05-04-000, Boise Cascade Corporation, International Falls, Minn.) which was clay-coated on one side by roll coating and was provided with a silicone coating on the other side. Immediately after the extruder die, the film/carrier system was passed through a nip roll at 6680 g/cm² pressure wherein the nip comprises a chrome roll at 118° C. and a rubber roll at 68° C. and the releasable layer of the carrier system was against the chrome roll. The film extrusion and the carrier system are described in Example 1 of U.S. Pat. No. 4,499,896 which is herein incorporated by reference. Twenty and one-half (20.5) grams per meter² of an adhesive prepared in accordance with U.S. Pat. No. RE24,906, comprising a 97:3 units of iso-octyl acrylate: acrylamide copolymer was applied to a release liner of 98 grams per meter² bleached, two side silicone coated paper (commercially available as "2-60BKG-157&99A" from Daubert Coated Products, Westchester, Ill.) utilizing a standard pressure feed die. The film side of the film/carrier system was laminated to the adhesive surface of the adhesive/liner system, thereby providing a barrier film.

Example 2

An adhesive-coated polyurethane barrier film with carrier system and a release liner prepared as described in Example 1 was cut to size (frontal area 40.64 cm by 86.36 cm, sleeves 30.48 cm by 58.42 cm) and the release liner removed from the adhesive surface. The adhesive side was laminated to the outside surfaces (frontal area and the sleeves) of two surgical gowns. One surgical gown was commercially available as "No. 0551" from Johnson & Johnson Medical Inc., Arlington, Tex. and the other surgical gown was commercially available as "No. 90112" from Kimberly-Clark Corporation, Neenah, Wis. The carrier system supported the thin polyurethane barrier film and made it possible to handle the barrier film without puckering or distortion during lamination. The carrier system was then removed, leaving the thin polyurethane barrier film laminated to the outside surface of the surgical gowns. The resulting surgical gown had an aesthetically pleasing appearance and feel, and was comfortable to wear without the usual heat build-up and clammy feeling associated with conventional rubber coated surgical gowns.

Example 3

Surgical gowns with barrier films adhered to some of the surfaces as described in Example 2 were tested for the Rate of Moisture Vapor Transmission (MVTR) using a test method based on ASTM E96-80 Water Method. A 100 ml glass jar with a 3.81 cm diameter hole centered in a screw-on cap was filled with 50 ml of water. Three 35 mm diameter samples were die cut from the laminated area of the surgical gowns. Each sample was centered over the adhesive side of a 5.07 cm² area hole of a foil adhesive ring. The sample and foil ring hole were lined up with a second foil ring with a 5.07 cm² area hole forming a foil/sample/foil assembly that was flat, wrinkle-free and that had no void areas in the sample area. A 4.445 cm diameter rubber washer was placed on the jar lid. The foil/sample/foil assembly was placed on the rubber washer with the film side of the sample up. The screw on cap was placed loosely on the jar. The jars complete with assemblies were placed in a constant temperature and relative humidity chamber for four hours at 38°

C.±0.6° C. and 10±2 percent relative humidity. The screw on cap was tightened so that sample material was level with the cap and the rubber washer was seated. The jars were removed from the chamber after four hours and weighed to the nearest 0.01 gram ($W_1$=initial weight). The jars were returned to the chamber for at least 18 hours. After at least 18 hours the jars were removed from the chamber and weighed again ($W_2$=final weight). The moisture vapor transmission rate in grams/meter$^2$ in 24 hours was calculated for each sample using the following:

$$MVTR = \frac{(W_1 - W_2)4.74 \times 10^4}{T(hours)}$$

The three readings for each gown were averaged and reported to the nearest gram.

The results are shown in Table 1.

TABLE 1

| Gown/Laminate | MVTR (grams/meter$^2$ in 24 hours) |
|---|---|
| "No. 0551" from Johnson & Johnson Medical Inc./urethane film | 825 |
| "No. 90112" from Kimberly-Clark Corporation/urethane film | 585 |

The high MVTR of the surgical gowns with barrier films laminated to the surface helped to explain the wearer's comfort.

Example 4

Surgical gown fabrics and surgical gown fabrics with barrier films adhered to their surface were tested for water resistance using AATCC Test Method 127-1989. An adhesive-coated polyurethane barrier film with carrier system and a release liner prepared as described in Example 1 was cut to size and the release liner removed from the adhesive surface. The adhesive side was laminated to the surface of two surgical gown fabrics. One surgical gown fabric was commercially available as "Fabric 450" from Johnson & Johnson Medical Inc., Arlington, Tex. and the other surgical gown fabric was commercially available as "Evolution® 3 Fabric" from Kimberly-Clark Corporation, Neenah, Wis. The carrier system supported the thin polyurethane barrier film and made it possible to handle the barrier film without puckering or distortion during lamination. The carrier system was then removed, leaving the thin polyurethane barrier film laminated to the outside surface Surgical gown fabric.

Surgical gown fabrics (measuring approximately 20×20 cm) with and without the barrier film laminate were tested as follows. AATCC Test Method 127-1989 measures the resistance of fabrics to the penetration of water under static pressure (water column measured in cm). Test specimens, mounted under the orifice of a conical well, were subjected to water pressure increasing at a constant rate (1 cm/second) until three points of leakage occur through the fabric. The apparatus consists essentially of an inverted conical well equipped with a coaxial ring clamp to fasten the fabric specimen under the well bottom. The apparatus introduces water from above the specimen over a circular area 11.4 cm in diameter and at the rate of 1.00 cm of hydrostatic head per second. A mirror is affixed below the specimen to enable the operator to ascertain penetration of the specimen by drops of water. Hydrostatic testing apparatus of the type described in this method is manufactured by the Alfred Suter Co., Orangeburg, N.Y. 10962.

Nine readings for each fabric or laminate were averaged and reported to the nearest cm. The face of the fabric or the barrier film surface of the laminate were tested. The results are shown in Table 4.

TABLE 4

| Sample | Resistance to water penetration (cm water static pressure) |
|---|---|
| "Fabric 450" from Johnson & Johnson Medical Inc. | 21 cm - leaked |
| "Fabric 450" from Johnson & Johnson Medical Inc. with barrier film laminated thereto | 72 cm - no leakage |
| "Evolution ™ 3 Fabric" from Kimberly-Clark Corporation | 48 cm - leaked |
| "Evolution ™ 3 Fabric" from Kimberly-Clark Corporation with barrier film laminated thereto | 72 cm - no leakage |

The above data illustrates that the above fabrics having barrier layer adhered thereto provide excellent fluid resistance.

Various modifications and alterations of this invention will be apparent to those skilled in the art without departing from the scope and spirit of this invention, and it should be understood that this invention is not limited to the illustrative embodiments set forth herein.

What is claimed is:

1. A protective garment, comprising:

a fabric substrate; and a barrier film comprising a thin, conformable polymeric film and a pressure sensitive adhesive, wherein the polymeric film is adhered to the fabric substrate by the pressure sensitive adhesive;

the fabric with barrier film applied thereto is resistant to the transmission of fluid water and has a moisture vapor transmission rate at least 500 g m$^{-2}$ 24 hrs$^{-1}$; and the barrier film is provided as a barrier film assembly comprising the thin, conformable polymeric film, the pressure sensitive adhesive attached to at least a portion of one surface of the polymeric film, a means for protecting the adhesive prior to application of the barrier film to a fabric substrate, and a means for handling the adhesive-coated polymeric film during application of the barrier film to the fabric substrate wherein the handling means is attached to the polymeric film more tenaciously than the protecting means is attached to the adhesive surface of the barrier film, and wherein the barrier film of the barrier film assembly is adapted to be applied to the fabric substrate by the adhesive surface of the assembly, placing the exposed barrier film assembly on the fabric substrate thereby adhering the barrier film to the fabric substrate, and removing the handling mean from the polymeric film.

2. The protective garment of claim 1, wherein the polymeric film has a thickness between 6 and 50 microns.

3. The protective garment of claim 1, wherein said polymeric film has an $F_{10}$ modulus of less than 180 gm/cm width.

4. The protective garment of claim 1, wherein the barrier film assembly is in the form of a pad of sheets, wherein the pad comprises a plurality of sheets of the thin, conformable polymeric film having the pressure sensitive adhesive attached thereto, and a plurality of separator sheets having a first release surface and a second releasable surface, wherein the releasable surface is attached to the polymeric film more tenaciously than the adhesive surface is attached to the release surface of an adjacent separator sheet.

5. The protective garment of claim 2, wherein said polymeric film is selected from the group consisting of polyurethane, elastomeric polyester, blends of polyurethane and polyester, and styrene/butadiene block copolymers.

6. The protective garment of claim 1, wherein said pressure sensitive adhesive is water dispersible.

7. The protective garment of claim 1, wherein said garment is a surgical gown, and wherein at least the chest portion of said surgical gown is covered with said barrier film.

8. The protective garment of claim 1, wherein the barrier film assembly is in the form of an individual sheet, the means for protecting the adhesive comprises a release liner attached to the adhesive-coated surface of the polymeric film, and the means for handling comprises a releasable carrier layer attached to the surface of the film opposite the surface containing the pressure-sensitive adhesive, the releasable carrier layer being attached to the polymeric film more tenaciously than the release liner is attached to the adhesive surface of the polymeric film.

9. The protective garment of claim 1, wherein the barrier film assembly is in the form of a roll, the means for protecting the adhesive comprises a release liner attached to the adhesive-coated surface of the polymeric film, and the means for handling comprises a releasable carrier layer attached to the surface of the film opposite the surface containing the pressure-sensitive adhesive, the releasable carrier layer being attached to the polymeric film more tenaciously than the release liner is attached to the adhesive surface of the polymeric film.

10. The protective garment of claim 1, wherein the barrier film assembly is in the form of a roll, and wherein the means for protecting the adhesive and the means for handling comprise a separator layer attached to the surface of the polymeric film opposite the surface containing the pressure-sensitive adhesive, the separator layer having a first release surface and a second releasable surface, wherein the releasable surface is attached to the polymeric film more tenaciously than the release surface is attached to the adhesive surface of the polymeric film.

11. A method for applying a thin, conformable polymeric film to a fabric substrate, comprising the steps of:

providing a barrier film assembly comprising a thin, conformable polymeric film, a pressure sensitive adhesive attached to at least a portion of one surface of the film, a means for protecting the adhesive prior to application of the film to a fabric substrate, and a means for handling the adhesive-coated film during application of the film to the fabric substrate, wherein the handling means is attached to the film more tenaciously than the protecting means is attached to the adhesive surface of the film, and wherein the film and adhesive have a moisture vapor transmission rate at least 500 g $m^{-2}$ 24 $hrs^{-1}$;

exposing the adhesive surface of the assembly;

placing the exposed adhesive surface of the barrier film assembly on the fabric substrate thereby causing the film to adhere to the fabric substrate; and removing the handling means from the film.

12. The method of claim 11, wherein said polymeric film has a thickness between 12 and 25 microns and an $F_{10}$ modulus of less than 140 gm/cm width.

13. The method of claim 11, wherein said barrier film assembly is selected from the group consisting of individual sheets, a roll of material and a pad of stacked sheets.

14. The method of claim 13, wherein said polymeric film is selected from the group consisting of polyurethane, elastomeric polyester, blends of polyurethane and polyester, and styrene/butadiene block copolymers.

15. The method of claim 11, wherein said fabric substrate comprises a surgical gown, wherein at least the chest portion of said surgical gown is covered with said barrier film.

16. A barrier film pad assembly, comprising: a thin, conformable polymeric film; a pressure sensitive adhesive attached to at least a portion of one surface of said film, and a separator sheet attached to the surface of said film opposite the surface containing said pressure-sensitive adhesive, said separator sheet having a first release surface and a second releasable surface, wherein said releasable surface is attached to said film more tenaciously than the adhesive surface is attached to the release surface of an adjacent separator sheet.

17. The barrier film pad assembly of claim 16, wherein the polymeric film has a thickness between 6 and 50 microns and an $F_{10}$ modulus of less than 180 gm/cm width, and wherein the polymeric film of the barrier film pad assembly is adapted to be applied to a fabric substrate by exposing the adhesive surface of the assembly, placing the exposed adhesive surface of the barrier film pad assembly on the fabric substrate thereby adhering the barrier film to the fabric substrate, and removing the separator sheet from the polymeric film.

18. The barrier film pad assembly of claim 17, wherein said polymeric film is selected from the group consisting of polyurethane, elastomeric polyester, blends of polyurethane and polyester, and styrene/butadiene block copolymers, and wherein said pressure sensitive adhesive is water dispersible.

19. The barrier film pad assembly of claim 17, wherein the barrier film pad assembly is sized and shaped to provide sheets of barrier film that cover one or more regions of a surgical gown.

* * * * *

UNITED STATES PATENT AND TRADEMARK OFFICE
CERTIFICATE OF CORRECTION

PATENT NO. : 5,673,433
DATED : October 7, 1997
INVENTOR(S) : Robert J. Rothrum

It is certified that error appears in the above-identified patent and that said Letters Patent is hereby corrected as shown below:

Col. 8, line 51, "heptaneiso-propanol" should read -- heptane-isopropanol --.

Column 11, lines 50 and 51, "surface Surgical gown fabric" should read --surface of the surgical gown fabric--."
Column 12, line 52, after "by" insert --exposing--

Signed and Sealed this

Twenty-ninth Day of June, 1999

Attest:

Q. TODD DICKINSON

*Attesting Officer*　　　　*Acting Commissioner of Patents and Trademarks*